J. FAWELL.
ROLLING MILL.
APPLICATION FILED JULY 1, 1908.
946,793.
Patented Jan. 18, 1910.
6 SHEETS—SHEET 1.
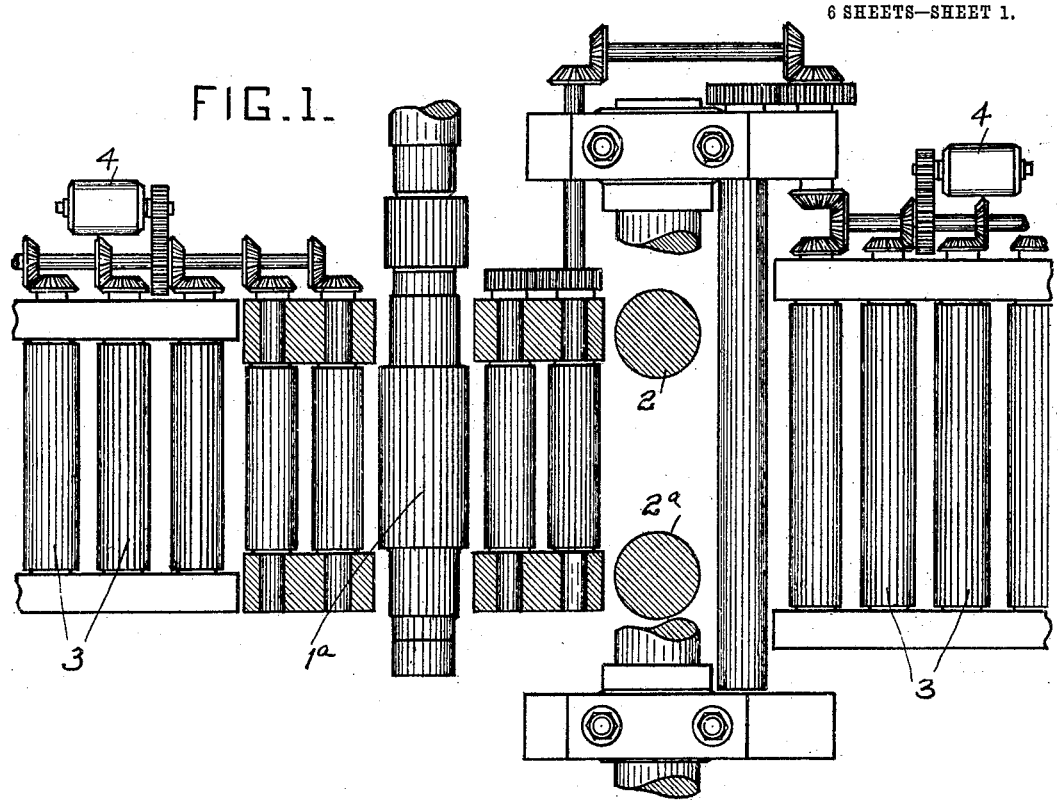
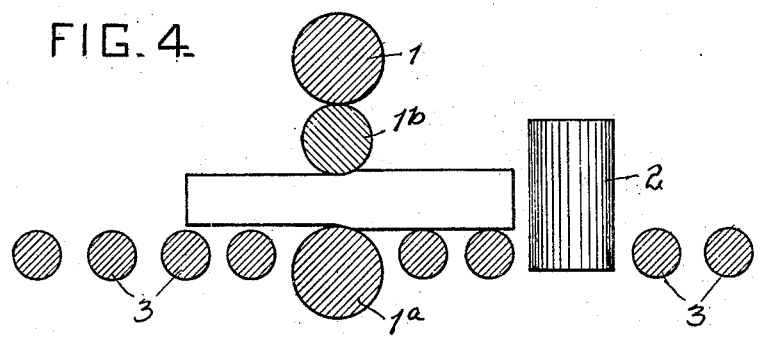
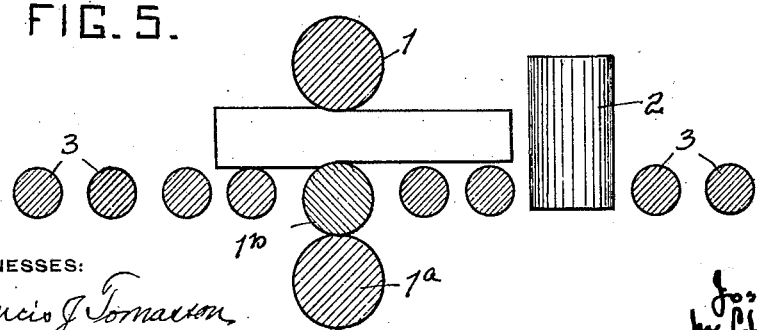
WITNESSES:
Francis J. Tomasson
J. Herbert Bradley
INVENTOR
Joseph Fawell,
by Christy & Christy
Atty's

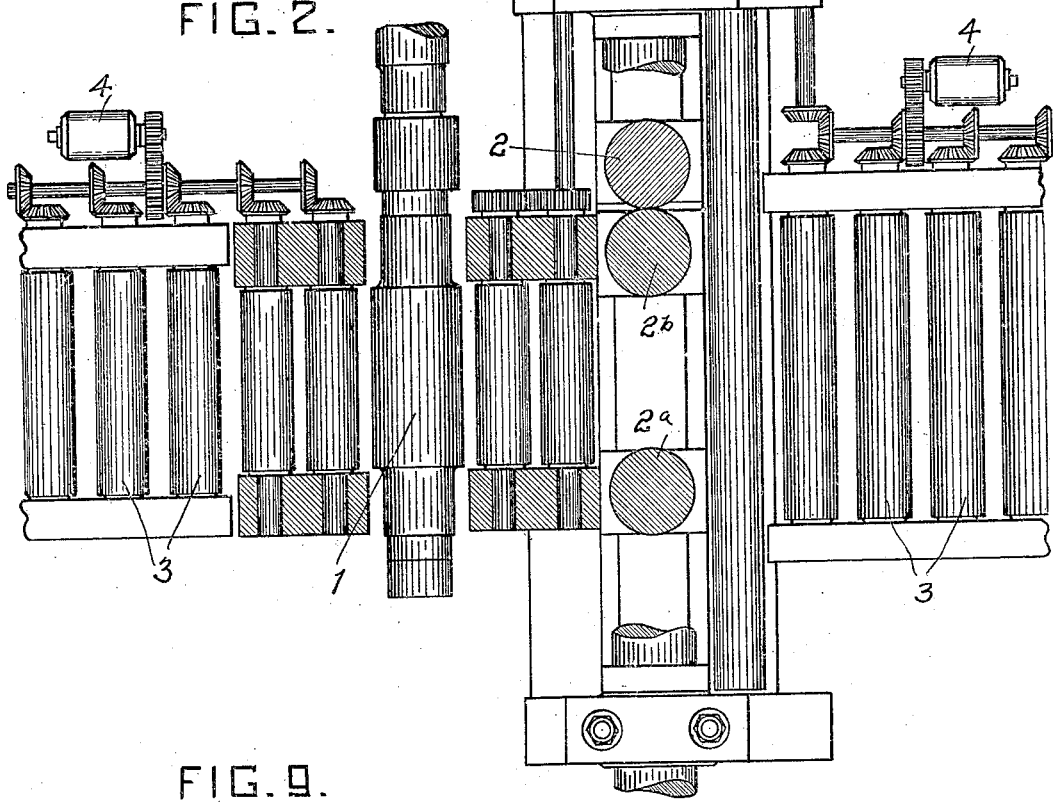
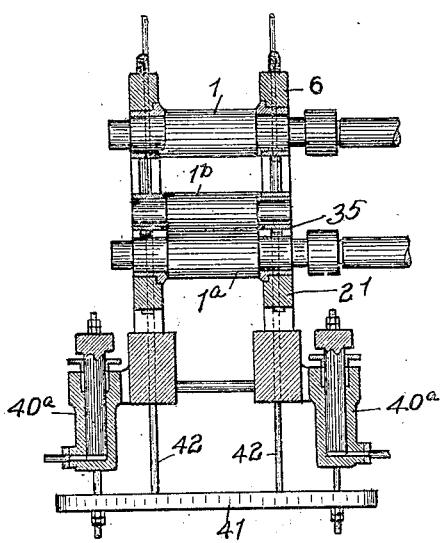
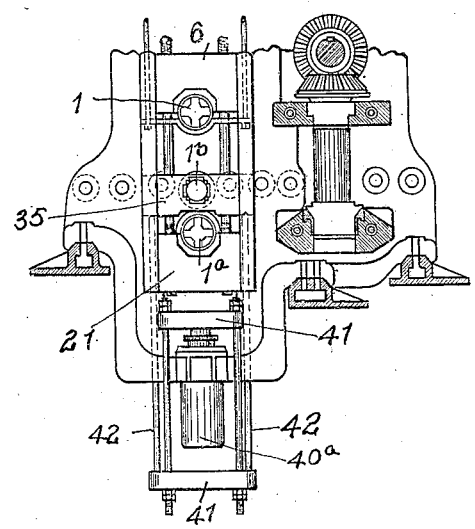

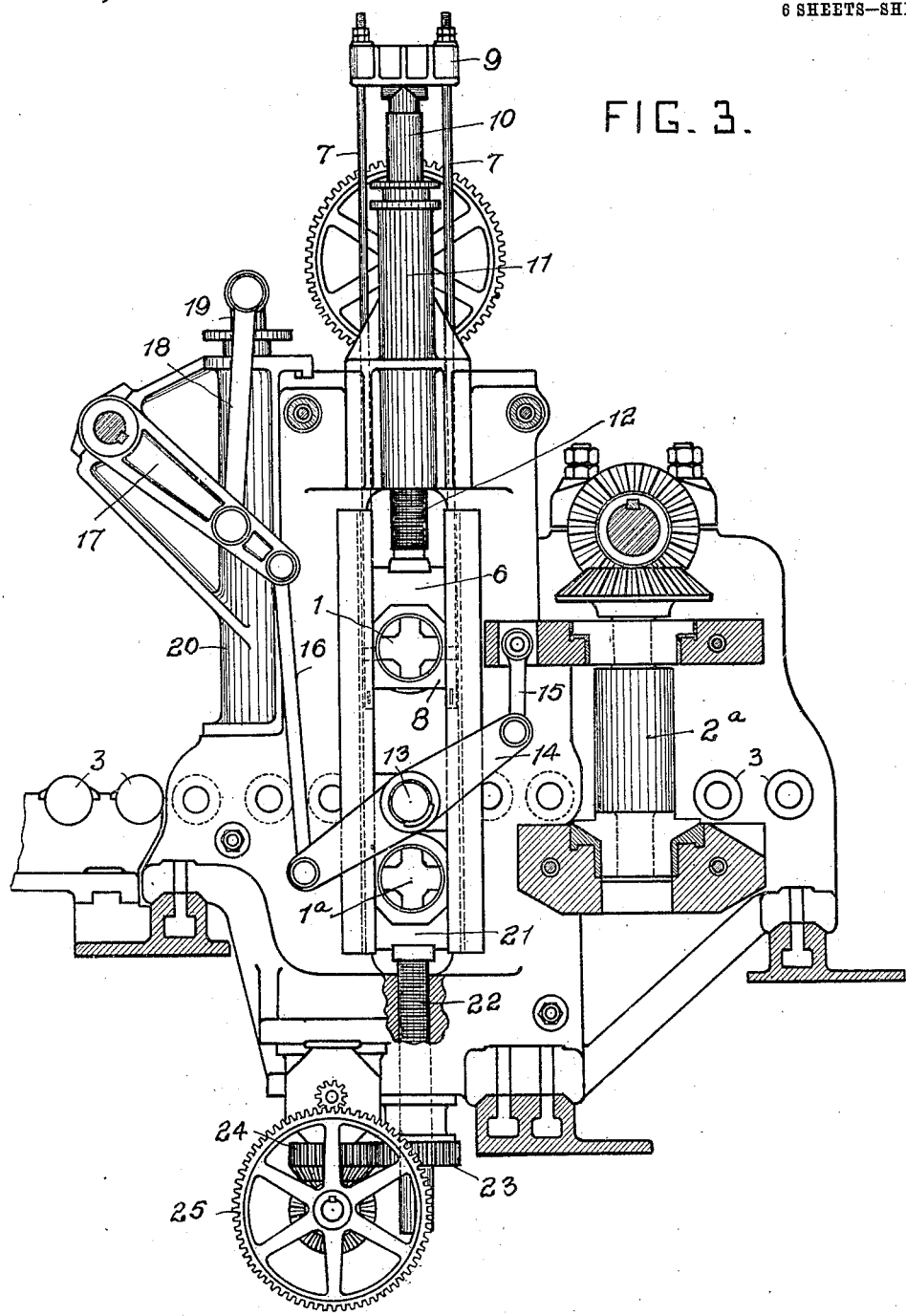

J. FAWELL.
ROLLING MILL.
APPLICATION FILED JULY 1, 1908.
946,793.
Patented Jan. 18, 1910.
6 SHEETS—SHEET 4.
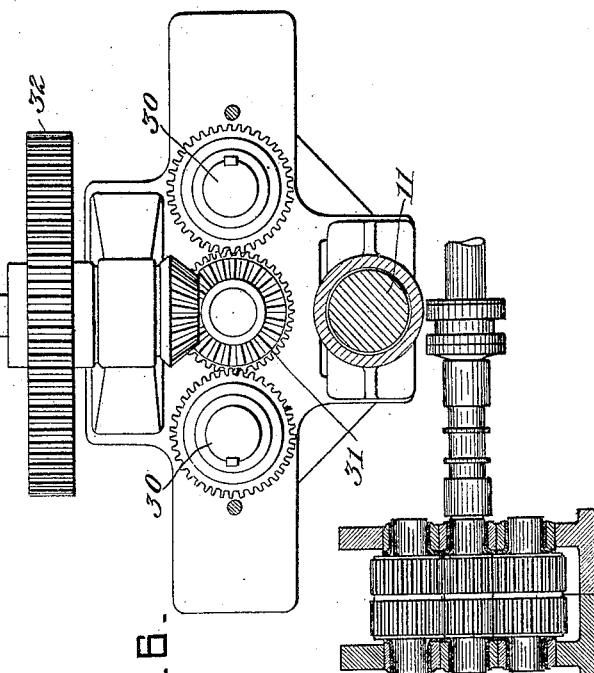
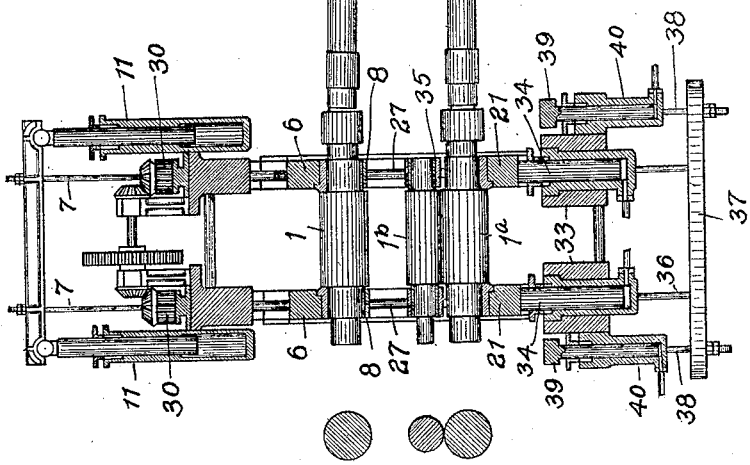
WITNESSES:
INVENTOR

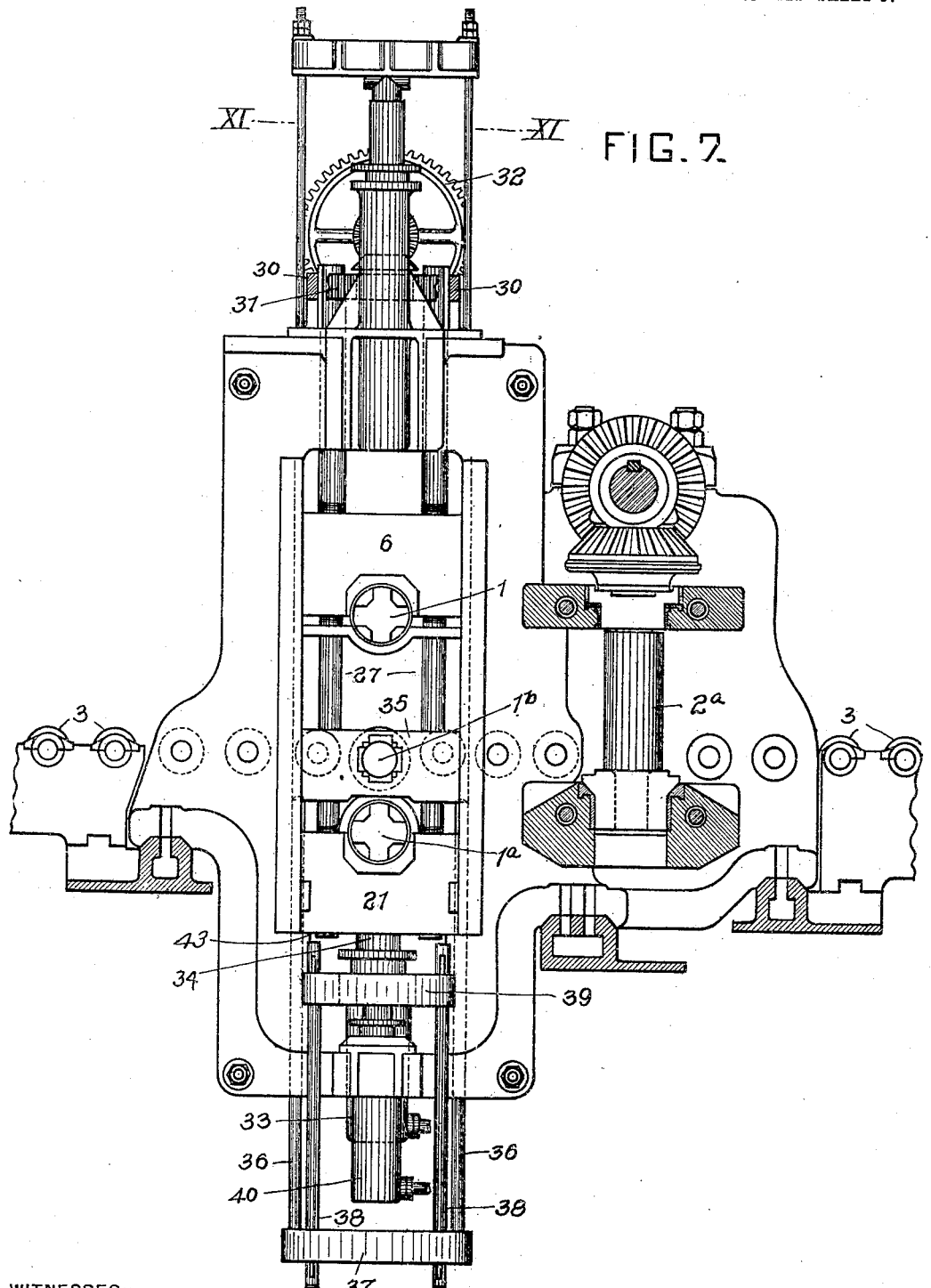

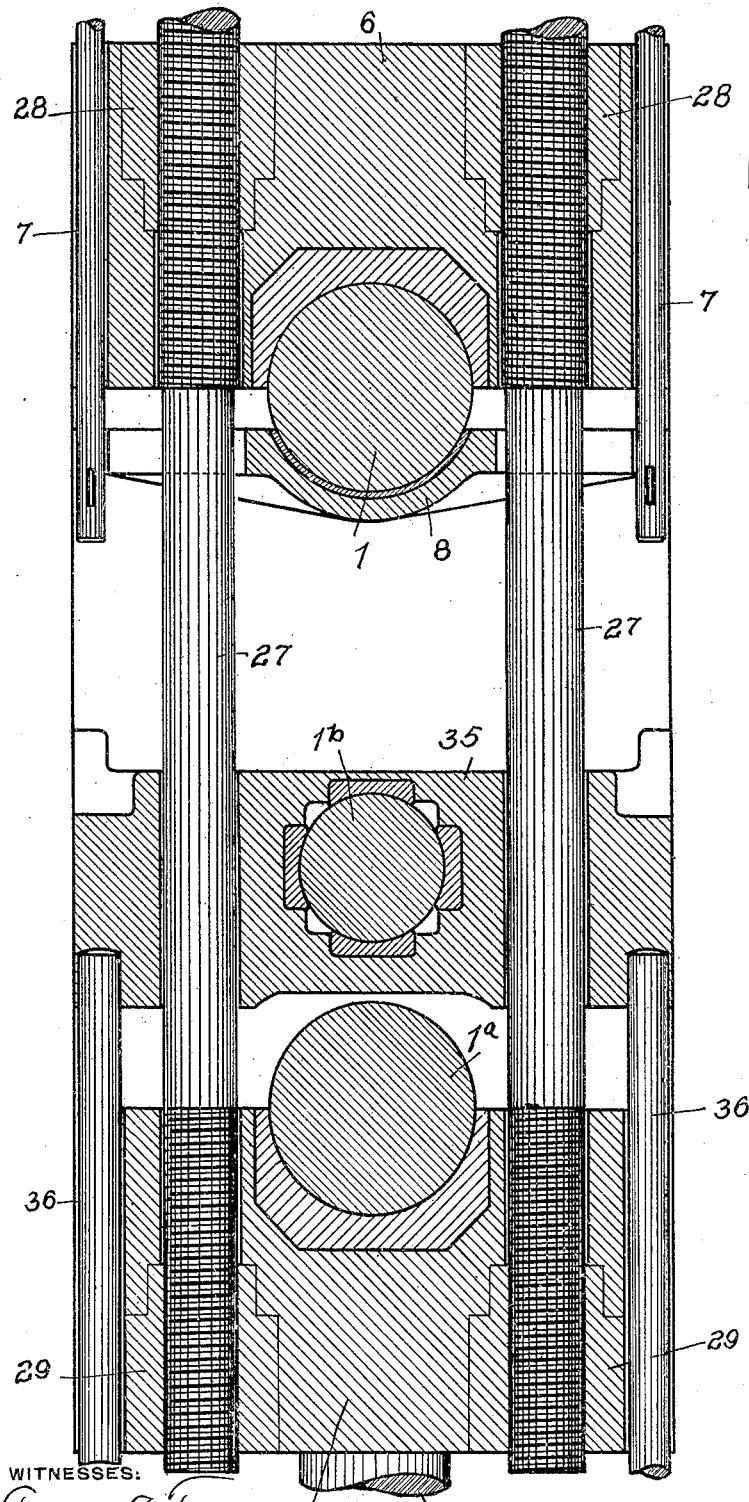

UNITED STATES PATENT OFFICE.

JOSEPH FAWELL, OF PITTSBURG, PENNSYLVANIA.

ROLLING-MILL.

946,793.  Specification of Letters Patent.  Patented Jan. 18, 1910.

Application filed July 1, 1908. Serial No. 441,374.

*To all whom it may concern:*

Be it known that I, JOSEPH FAWELL, residing at Pittsburg, in the county of Allegheny and State of Pennsylvania, a citizen of the United States, have invented or discovered certain new and useful Improvements in Rolling-Mills, of which improvement the following is a specification.

The invention described herein consists generally stated in providing a mill having horizontal and if desired also vertical rolls in combination with a vertically stationary feed mechanism, and mechanism for shifting the horizontal rolls with relation to the feed mechanism.

The invention is hereinafter more fully described and claimed.

In the accompanying drawings forming a part of this specification, Figure 1 is a view partly in plan and partly in section of a rolling mill embodying my improvement and having horizontal and a stand of vertical rolls; Fig. 2 is a similar view of a mill having a stand of three vertical rolls; Fig. 3 is a side elevation of my improved mill illustrating the mechanism for shifting the horizontal rolls; Figs. 4 and 5 are diagrammatic views illustrating the positions of the horizontal rolls relative to the feed table in a forward and a backward pass. Fig. 6 is a side elevation of a mill embodying a modification in the mechanism for shifting the horizontal rolls, Fig. 7 is an end elevation of the mill shown in Fig. 6. Fig. 8 is a sectional elevation on an enlarged scale showing the journal boxes of the several horizontal rolls, together with a desirable form of mechanism for adjusting the relative positions of the outer rolls. Fig. 9 is a front elevation of a mill illustrating a modification of the construction shown in Figs. 6 and 7. Fig. 10 is a side elevation of the mill shown in Fig. 9 and Fig. 11 is a sectional plan on a plane indicated by the line XI—XI Fig. 7.

In the practice of my invention the horizontal rolls 1 1ª and 1ᵇ are arranged in suitable housings and have their journals mounted in boxes movable along suitable guides formed in the windows of the housings. The vertical rolls 2 2ª when employed are arranged in suitable housings and adapted to be adjusted back and forth toward each other by any suitable form or construction of mechanism, such for example as that shown and described in Letters Patent No. 525,263, dated August 28th, 1894. Instead of two vertical rolls, as shown in Fig. 1, three vertical rolls 2 2ª and 2ᵇ may be employed so as to avoid a reversing of the rolls, if edging is required at each pass, when such rolls are positively driven. The mechanism for adjusting these rolls may be of any suitable construction, such for example as that shown in Letters Patent No. 382,035, dated May 1st, 1888. The feed mechanism consists preferably of a table provided with rollers 3, is made stationary and suitable driving mechanism as the motor 4, is employed for rotating these rollers first in one direction and then in a reverse accordingly as the article is to be moved with reference to the rolls. In operating this mill, the rolls are so adjusted for the forward pass as to the right in Fig. 5 that the roll 1ª projects slightly above a plane tangential to the rollers of the feed table, the lower one is adjusted so as to hold the roll 1ᵇ which at this pass is in contact with the roll 1ª in a position to make the required reduction on the billet or bloom. During the back pass or to the left in Fig. 4 the positions of these rolls are changed. The roll 1ª is raised so as to project above the feed rollers the intermediate roll 1ᵇ which is supported to be driven by the upper roll in this pass, and the upper roll 1 are raised, the latter a distance equal to the diameter of the intermediate less the amount of reduction to be effected in this pass. During the back and forth passes the vertical rolls may be adjusted to operate upon the ingot or bloom if required and, when two vertical rolls are employed and they are positively driven; the direction of rotation must be reversed for this back pass.

In Fig. 3 is shown a construction of mechanism whereby the movement of the horizontal rolls heretofore described, can be effected. The journals of the upper roll are held against the bearing blocks 6 by means of rods 7 connected to yokes 8 on the underside of these journals of the upper roll. These rods 7 are connected to a cross head 9 secured to rams 10 of the fluid pressure cylinders 11, which in the construction shown are arranged on the top of the housings. These cylinders are connected to accumulators which will maintain within the cylinders sufficient pressure to hold the rolls and the block 6 against the adjusting screws 12 which may be operated to shift the upper roll in any desired or suitable manner known in the art. As will be understood by those skilled in the art, the upper roll 1 will always follow the movement of the screw 12 being yieldingly held against the same by the accumulator pressure in the cylinder 11. The journals 13 of the intermediate roll $1^b$ project into openings formed on floating levers 14 having one end connected by links 15 to a stationary portion of the housings. The opposite ends of these levers are connected by rods 16 to arms 17 pivotally mounted on the housings and also connected by links 18 to rams 19 of the fluid pressure cylinders 20. As will be understood the admission to or escape of fluid pressure from these cylinders will effect a shifting of the roll $1^b$ up or down. The bearing blocks 21 for the journals of the lower roll $1^a$ rest upon screws 22 passing through threaded openings or nuts in the housings and through pinions 23 having a splined connection with the screws and intermeshing with pinions 24 operated in any suitable manner, as by the hand or power driven wheel 25. In Fig. 3 the rolls are shown in position for the reduction indicated in Fig. 5 the ingot or bloom moving to the right. When the back pass is desired the screw 12 is rotated so as to raise the upper roll 1 a distance less than the diameter of the intermediate roll by an amount equal to the draft required in this pass. Simultaneous with or subsequent to the adjustment of the upper roll, the intermediate roll is shifted up into contact with the upper roll and the lower roll is also raised to operative position as shown in Fig. 4.

In the construction shown in Figs. 6, 7 and 8, the bearing blocks 6 and 21 of the upper and lower rolls are connected by rods 27 having right and left hand threaded portions. The upper threaded portions engage threaded openings 28 through the bearing block 6 and the lower threaded portions engage similarly threaded openings 29 in the bearing block 21. These rods 27 extend up through the top of the window of the housings, and are provided at their upper ends with pinions 30 intermeshing with a driving pinion 31 which may be operated in any suitable manner as by a hand or power driven wheel 32. By rotating these screws the positions of the upper and lower rolls can be adjusted relative to each other as required. In addition to effecting the relative adjustments of the upper and lower rolls these screws also tie the journal blocks 6 and 21 of said rolls together so that these rolls can be simultaneously shifted relative to the plane of feed of an article resting on the feed table. This vertical adjustment of both rolls can be effected in any suitable manner as for example by fluid pressure cylinders 33, the rams 34 of said cylinders bearing against the journal blocks 21 of the lower rolls. The upper roll is held in position relative to the bearing block 6 by the fluid pressure cylinders 11 operating through the rods 7 and the yoke 8 as hereinbefore described. The cylinders 11 are connected to an accumulator and will serve not only to hold the upper roll in proper position relative to the bearing block 6 but also will assist in the vertical movement of both rolls. The intermediate roll has its journals mounted in blocks 35 movable along suitable guides in the window of the housings. These blocks 35 rest upon rods 36 secured to cross heads 37 which in turn are suspended by rods 38 from cross heads 39 carried by the rams of fluid pressure cylinders 40.

It will be understood by those skilled in the art that the bearing blocks 6 and 21 with the adjusting screws 27 form a cage or frame containing the upper and lower rolls in adjustable relation to each other and that by shifting such frame these rolls are moved relative to the feed table. For a pass in one direction the cage or frame is lowered so that the lower roll will be below the plane of feed by an amount a little less than the diameter of the intermediate roll as heretofore described. For the next pass the cage or frame is shifted until the lower rolls is slightly above the plane of feed and at the same time the intermediate roll is lifted up by the cylinders 40 into contact with the upper roll and the upper and lower rolls are adjusted toward each other by the pinions 30 a distance proportional to the draft to be effected in such pass.

In lieu of shifting the cage or frame carrying the upper and lower rolls by independent fluid pressure cylinders 33, fluid pressure cylinders $40^a$ can be employed for shifting, not only, the intermediate roll but also both rolls as shown in Fig. 9. In this construction the rams of the cylinders $40^a$ are connected to a cross head 41 to which are also secured rods 42 bearing at their upper ends against the block 35 carrying the intermediate roll. When the frame is to be raised the intermediate roll will move up against the upper roll and in conjunction with the accumulator cylinders 11 raise the frame and with it the upper and lower rolls. On the pass in the reverse direction fluid is allowed to escape from the cylinders $40^a$ when the frame will drop down onto suitable stops 43 and the intermediate roll is moved down into contact with the lower roll.

I claim herein as my invention:

1. In a rolling mill, the combination of a stand of three-high rolls, a feed mechanism, means for simultaneously shifting all of the rolls relative to the feed mechanism and means for moving the intermediate roll relative to the other rolls.

2. In a rolling mill, the combination of a stand of three high rolls, a feed mechanism, means for simultaneously shifting the outer rolls relative to the plane of feed and means for shifting the intermediate roll.

3. In a rolling mill, the combination of three high rolls, a reversible feed mechanism, means for simultaneously shifting the outer rolls relative to the plane of feed and means for shifting the intermediate roll.

4. In a rolling mill, the combination of a stand of adjustable three high rolls, and means for shifting the intermediate roll, the movement of the outer rolls being controlled by the intermediate roll.

5. In a rolling mill, the combination of a stand three high horizontal rolls, vertical rolls, a reversible feed mechanism horizontally stationary, and means for shifting all of the horizontal rolls relative to the plane of feed.

6. In a rolling mill the combination of a stand of three high rolls, means for adjusting the outer rolls relative to each other, means for simultaneously shifting both outer rolls, and means for shifting the intermediate roll.

7. In a rolling mill, the combination of a stand of three high rolls, means for adjustably connecting the outer rolls, an intermediate roll, and means for shifting the intermediate and outer rolls simultaneously.

8. In a rolling mill, the combination of horizontal rolls, an adjustable means for connecting said rolls, feed mechanism, and means for simultaneously shifting said rolls with reference to the line of feed.

9. In a rolling mill the combination of a stand of three-high rolls, means for connecting the outer rolls and means for shifting the intermediate roll relative to the line of feed of the article to be rolled and thereby changing the position of the outer rolls relative to said line of feed.

10. In a rolling mill the combination of a feed mechanism, a stand of three-high rolls, means for adjustably connecting the outer rolls, means for shifting the outer rolls relative to the feed mechanism and means for shifting the intermediate roll relative to the outer roll.

In testimony whereof, I have hereunto set my hand.

JOSEPH FAWELL.

Witnesses:
 CHARLES BARNETT,
 FRANCIS J. TOMASSON.